Oct. 15, 1968

S. A. YOUNG ET AL 3,405,729

VALVE WITH TWO-WAY SHUT-OFF

Filed Oct. 1, 1965

INVENTORS
S. A. YOUNG &
BY G. E. CHRISTIANSEN

Robb & Robb
Attorneys

United States Patent Office 3,405,729
Patented Oct. 15, 1968

3,405,729
VALVE WITH TWO-WAY SHUT-OFF
Stephen A. Young, Monticello, Ind. (% Stephen A. Young Corporation, Flora, Ind. 46929), and Gerald E. Christiansen, Flora, Ind.; said Christiansen assignor to said Young
Filed Oct. 1, 1965, Ser. No. 492,066
1 Claim. (Cl. 137—329.2)

ABSTRACT OF THE DISCLOSURE

This invention relates to valve construction for use in domestic plumbing systems, wherein said valves are occasionally in need of replacement of the seat washer therein, there being provided by this invention a form of additional shut off means which is operative when the valve control means is removed so as to shut off incoming water and thereby enable replacement of the seat washer without shutting off the main supply or an adjacent shut off valve separate from that being repaired. The concept of the invention involves the use of dual shut off areas to absolutely prevent any leakage whatsoever since shut off areas are provided which both act to positively seal and prevent leakage.

---

This invention relates to valve construction and particularly to construction of valves for use in domestic plumbing systems involving the accasional and often required replacement of the seat washers thereof, the usual provisions for replacement of seat washers being the inclusion in the plumbing system of a series of valves in addition to those which directly control the water distributed thereby at the ultimate place of use.

More particularly the invention is directed to valve construction in which a secondary valve unit or shut-off unit is incorporated, the particular objective being to simplify such construction and obviate some of the problems which have arisen heretofore in prior art constructions.

In the prior art, and reference is made by way of example, to the use of what are called lavatory fittings, such fittings often by reason of the frequency of their use develop leaks at the seat and between the seat and seat washer so that it necessarily requires replacement of such seat washers. In order to reduce the cost of installation, in most cases under current construction methods, the usual stops are eliminated at the supply for the faucet so that it is necessary to turn the water off at the source and this usually means throughout the entire residence.

If, therefore, a means can be developed which will obviate the necessity to turn the entire plumbing system off in-order to replace a washer in a single faucet, it will be obvious that particular advantage is acquired therefrom and if the cost of so doing is small enough, the ultimate cost of the fitting in which it is incorporated will not be substantially increased.

The principal object of the present invention is to accomplish the foregoing general objectives of eliminating the necessity to provide stops and at the same time facilitate the replacement of a seat washer where the same leaks for one reason or another.

Another object of the invention is to provide a simple seat construction in which is incorporated a secondary shut-off means which is operable upon withdrawal of the usual controlling instrumentalities from the device for the replacement of the seat washer, without the necessity to actuate the same, this actuation being accomplished automatically.

An even more specific object of the invention is to provide a shut-off means incorporated in valve seat structure which avails of more than one shut-off sealing arrangement, since this particular structure itself involves a gasket or the like and if this gasket should in some manner become injured or damaged then it is still desirable to provide for shut off and this invention accomplishes the same.

Other and more specific objects of the invention will be understood from the consideration of the specification appended hereto and disclosed in the drawing wherein.

Figure 1:
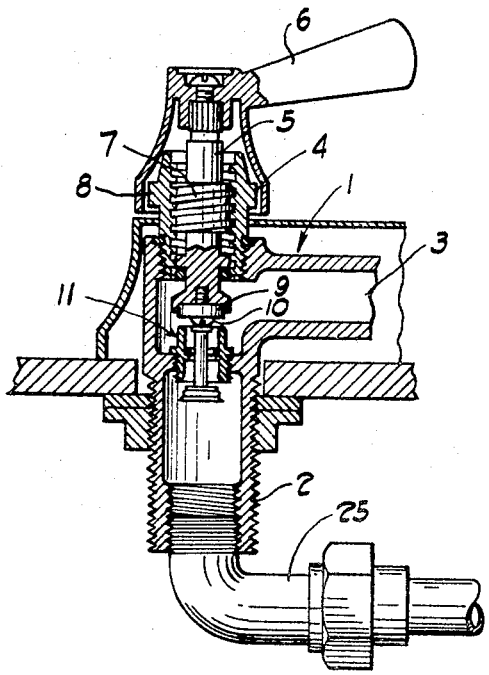
FIGURE 1 is a vertical sectional view through a valve in which is incorporated the shut off means of this invention.

Referring now to FIGURE 1, a typical lavatory fixture or a fragment thereof, is illustrated, and includes a body generally designated 1, having an inlet 2 therefor with an outlet 3 leading to a spout or other instrumentality through which the fluid flowing through the valve is to be dispensed.

Control means for the inlet and outlet is incorporated in a usual stem and bonnet construction generally denoted at 4, said control means including a stem 5 having a handle 6 at the upper end thereof, the stem 5 involving the usual coarse pitch operating thread 7 thereon operable in a bonnet 8 which in turn screws into the body 1 in any well known manner.

At the lower end of the stem 5 is a seat washer 9, suitably maintained in its position at the end of the standard seat washer screw designated 10.

Figure 2:
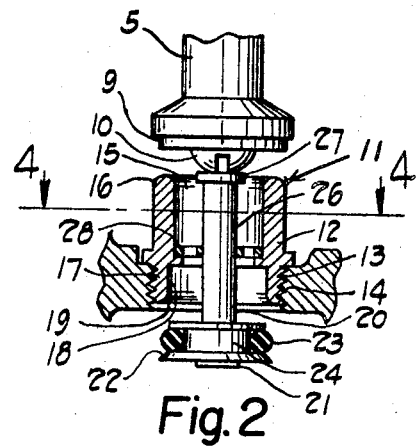
FIGURE 2 is an enlarged fragmentary sectional view illustrating in greater detail on enlarged scale the secondary shut-off means hereof.
Figure 3:
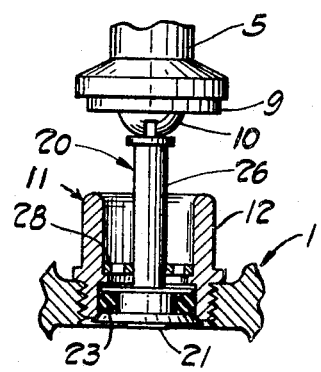
FIGURE 3 is a view similar to FIGURE 2 with the shut-off means in closed position.
Figure 4:
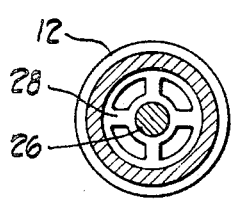
FIGURE 4 is a horizontal sectional view taken about on the line 4—4 of FIGURE 2 looking in the direction of the arrows.

Intermediate the inlet and outlet 2 and 3 respectively, is a seat unit generally designated 11, shown in enlarged detail in FIGURE 2 as including a seat member 12 which is provided with threads 13 at the lower end thereof adapted to engage mating threads 14 in the body 1, the seat 12 incorporating a passage 15 extending therethrough.

At the upper end of the seat 12, is a seat face 16 which cooperates with the seat washer 9 previously referred to in the usual manner to shut off water flow through the passage 15.

At the lower end of the seat 12, is a shut-off section generally designated 17, said shut-off section involving a cylindrical section 18 with a radiused contact area 19 at the extremity thereof.

Figure 7:
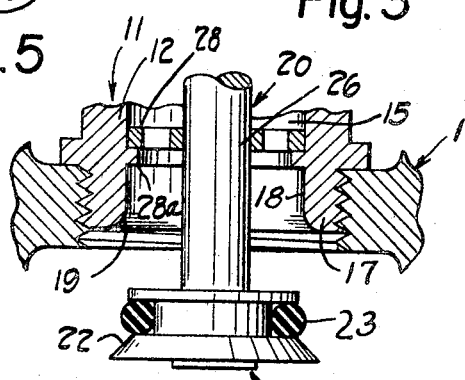
FIGURE 7 is a greatly enlarged, fragmentary view of the secondary shut-off means.

Mounted in the passage 15, is a shut-off device generally designated 20, which shut-off device is shown in greatly enlarged detail in FIGURE 7, said device including a head portion 21 which cooperates with the shut-off section 17 to prevent flow of fluid through the passage 15 under conditions which will be described subsequently.

The head portion 21 of the shut-off device 20 involves a precision-ground section 22 which when mated with the radiused contact area 19 previously referred to will prevent fluid flow through the passage 15.

The contact area 19 is formed with a radius of $\frac{1}{64}$ inch which has been found to be most satisfactory when the precision-ground section 22 is formed with a 60 degree angle, the surface being provided with a 60 micro-inch finish, the dimensions of the respective parts being based on a minor diameter of the section 22 of .310 inch and the surface being ⅛ inch long from said minor diameter and sloping outwardly therefrom.

In addition to this section 22, there is provided a suitable gasket means 23, preferably an O-ring which is carried in a retaining section 24 formed in the head portion 21.

The O-ring gasket means 23 is intended to engage the cylindrical section 18 and thereby in and of itself shut off water flow through said section, by reason of the pressure of such water entering through the inlet 2 by means of suitable supply line 25 acting on said head portion.

The head portion 21 is connected to a rod-like guide part 26, preferably being formed integrally with said head portion 21, the upper end of the guide part 26 being provided with a head 27 thereon adapted to engage the seat washer screw 10 previously described said head 27 being formed by upsetting after the part 26 has been positioned.

Figure 5:
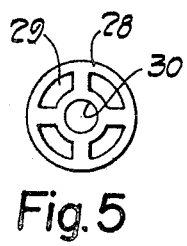
FIGURE 5 is a plan view of the positioning element used in the seat structure.
Figure 6:
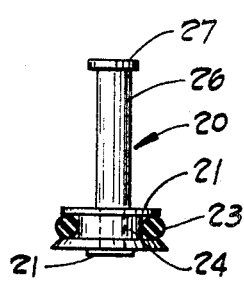
FIGURE 6 is a side view of the shut-off device, the gasket thereof shown in section.

Within the passage 15 of the seat 12, a positioning element 28 is provided, this being shown in greater detail by itself in FIGURE 5, as being a washer like part having a series of segmental openings 29 extending therethrough with a central circular opening 30 through which the guide part 26 extends.

This element 28 may be fitted into the passage 15 by pressing the same thereinto so as to contact a shoulder 28a formed in the seat 12, or alternatively might be formed with the seat so as to be integral therewith if found desirable.

From the foregoing it will be understood that shut off or fluid flow through the seat 12 may be accomplished in two different ways, usually during the course of use of the faucet or fitting in which the mechanism hereof is incorporated by manipulation of the handle 6 and the stem 5 attached thereto whereby the seat washer 9 comes into contact with and engages the seat 16 with sufficient pressure to prevent fluid flow through the passage 15.

Alternatively if it is desired to replace the seat washer 9, withdrawal of the stem 5 by means of removal of the bonnet 8 in which the stem is mounted, will result in pressure of the liquid in the inlet 2 causing the shut-off device 20 to move upwardly whereby the gasket means 23 will initially contact the cylindrical area 18 and prevent fluid flow through the seat passage 15.

Thereafter continued application of pressure on the head portion 21 will cause the precision-ground section 22 to come into engagement with the contact area 19 of the seat 12. Thus there are dual sealing provisions, although it is pointed out that only one is required, the provision of the dual seating means being an additional way of shutting off fluid flow through the seat passage 15 under the conditions set forth.

When the seat washer 9 has been replaced as by removing the seat washer screw 10 for that purpose, replacement of the bonnet 8 and associated parts, will make possible the manipulation of the handle 6 so as to move the stem 5 downwardly, and engage the head 27 on the shut off device 20 thereby unseating the head portion 21 and associated gasket and seating elements so that fluid flow may again take place through the passage 2 and openings 29 in the positioning element 28 and thereby through the seat passage 15 and to the ultimate outlet connected to the outlet 3 previously described.

It is noted that the normal use of the fitting requires that the seat washer 9 be moved upwardly by the stem 5 within a certain range to provide for flow of fluid through the passage 15 in the seat 12 and normally the head portion 21 of the shut-off device 20 will not be brought into play for shut off purposes, the seat washer 9 moving only sufficiently off the seat face 16 to permit the desired flow through the seat passage and not to such an extent that will cause the head portion 21 of the shut off device 20 to move into shut off position as previously described but only when replacement of the washer 9 or intentional manipulation of the handle 6 is resorted to for this purpose.

We claim:

1. In a faucet valve construction comprising a valve body, means defining an inlet and an outlet, and flow control means disposed within said valve body, the combination comprising: first, second and third valving means, said first valving means including a substantially tubular sheet member disposed within said valve body, means defining a first seating portion integrally formed at one extremity of said tubular member, means defining a manually operable control member cooperable with said first seating portion on said tubular member to regulate the flow of the fluid therethrough, a second seat portion disposed at the opposite end of said tubular member, said second seat portion including an angularly disposed ground seat, said third seat portion of said faucet valve construction including an annular seating surface formed within the interior of said tubular seat member and disposed between said first and said second seat portions, second and third control devices including pressure-responsive valving means carried by said tubular seat member and operable between controlling positions in response to variations in fluid pressure and the position of said first control means, said second and third control means including a unitary valve element having an angularly disposed ground seating surface complementary to said second valve seat on said tubular valve member, means defining an annular seat receiving portion adjacent said angular seating portion on said second and third control means, and O-ring means disposed within said annular seating portion cooperable with said third seat means in said tubular member when said first control valve means is removed from the valve and said second control valve means is engaged with said second seat means in said tubular member.

References Cited

UNITED STATES PATENTS

| | | | |
|---|---|---|---|
| 2,076,805 | 4/1937 | Wine | 137—329.2 |
| 2,796,881 | 6/1957 | Scheiwer | 251—215 X |
| 2,845,083 | 7/1958 | Graybill | 137—329.2 |

WILLIAM F. O'DEA, *Primary Examiner.*

D. MATTHEWS, *Assistant Examiner.*